Oct. 11, 1960 K. RABE ET AL 2,955,838
AUXILIARY STEERING ARRANGEMENT FOR TRACTORS
Filed May 14, 1958
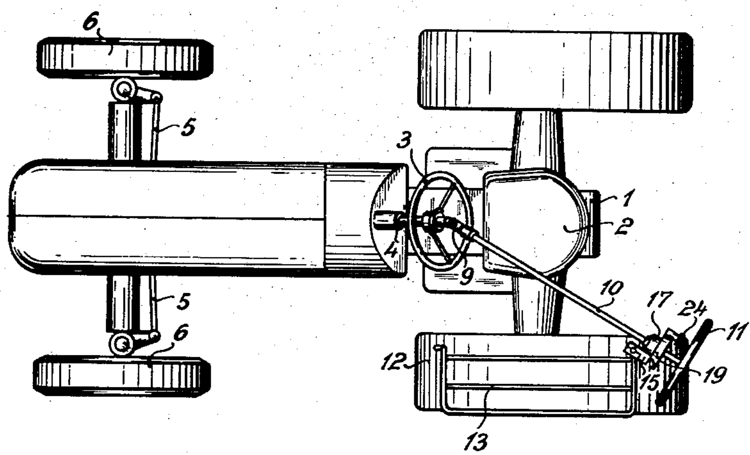
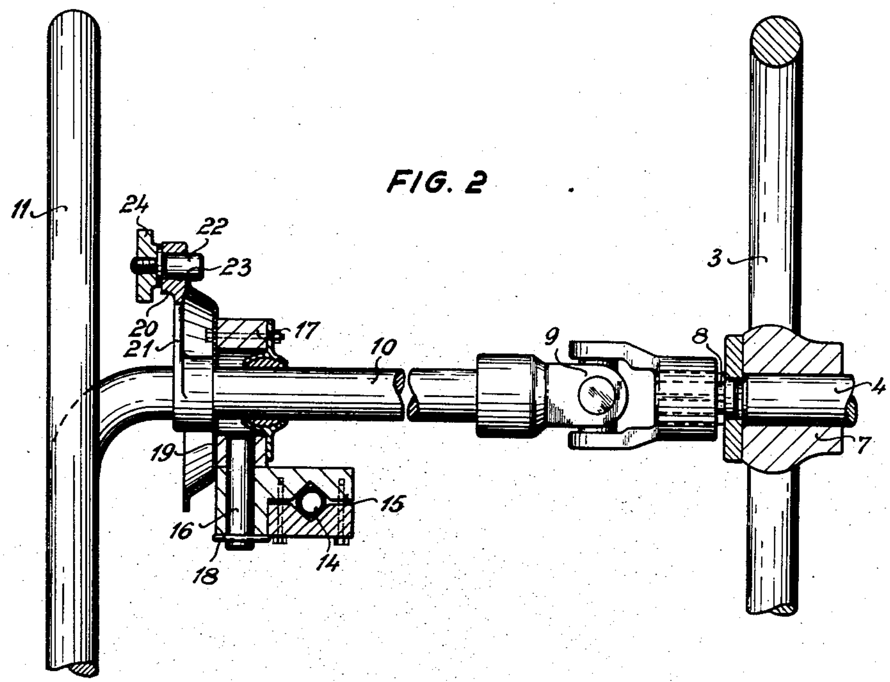
INVENTORS
KARL RABE
KARL RUOFF
BY Dicke and Craig
ATTORNEYS United States Patent Office 2,955,838
Patented Oct. 11, 1960

2,955,838

AUXILIARY STEERING ARRANGEMENT FOR TRACTORS

Karl Rabe, Korntal, Wurttemberg, and Karl Ruoff, Kirchheim, Teck, Germany, assignors to Dr. Ing. h. c. F. Porsche K.G., Stuttgart-Zuffenhausen, Germany Filed May 14, 1958, Ser. No. 735,284

Claims priority, application Germany July 20, 1957

4 Claims. (Cl. 280—87)

The present invention relates to a tractor provided with a steering wheel arranged in front of the driver's seat which is mounted on a steering column.

In agricultural operations, such as during loading of hay or grain, distributing fertilizer or the like, with one-man operation, the tractor moves over the field with a relatively low velocity while steering thereof is realized by means of the steering wheel which is arranged ordinarily in front of the driver's seat. For that purpose, however, with one-man operations, the operator has to step back into the region between front and rear wheels of the moving tractor whereby already the slightest carelessness may lead to accidents.

In order to avoid these disadvantages, it has already been proposed in the prior art to arrange at the steering column a pivotally supported steering lever which extends with the free end thereof beyond the steering wheel into the region between the front and rear wheels. By this prior art construction, the danger of accident is reduced; however, such a construction entails the disadvantage that a smaller maximum deflection or steering angle of the steering wheels has to be accepted since the maximum deflection angle of the steering lever is limited in such a construction.

According to the present invention, these disadvantages and shortcomings of the prior art are avoided in that the steering column is extended beyond the driver's seat by means of a spindle connected with the hub of the steering wheel in such a manner that the steering operation may be carried out from the side of the tractor, especially from a point outside the area between front and rear wheels.

By the use of an arrangement in accordance with the present invention, it is possible to actuate the tractor with full angular deflection of the steering wheels, i.e., with a steering movement of the wheels over the entire normal steering range thereof. Furthermore, such an arrangement avoids the necessity that the operating person has to step into the area between the front and rear wheels, which is highly dangerous, so that a safe operation and actuation of the tractor is assured thereby.

A spatially favorable arrangement may be obtained in accordance with the present invention if the auxiliary spindle extends laterally of the driver's seat and extends beyond a cover or fender for the rear wheel. The auxiliary spindle is connected in a readily detachable manner with the steering wheel by means of a universal joint so that it may be removed without any great loss of time. By reason of the further fact that the auxiliary spindle is integral or made in one piece with an auxiliary steering wheel, it may be readily actuated and may be manufactured in a relatively inexpensive way. The auxiliary spindle is pivotally connected within the region of the auxiliary steering wheel by means of a clamping device at the auxiliary seat which is arranged on the rear fender or cover for one of the rear wheels. The auxiliary spindle is further provided with a relatively stationary dowel pin which is retained in the clamping device by a spring clamp. By the use of such a construction, a relatively simple support and bearing is obtained for the auxiliary steering installation which, if so desired, may be removed with relatively few manual operations. The hub of the auxiliary spindle carries a locking disk by means of which the desired driving direction may be maintained with the aid of a shift lock. By the use of this device, the tractor retains the desired preselected driving direction without further supervision.

Accordingly, it is an object of the present invention to provide a steering arrangement for tractors which is simple in construction and easy to operate by the driver.

Another object of the present invention is to provide a steering arrangement for a tractor which is particularly suitable for one-man operation of the tractor during agricultural operations and which minimizes the danger of accidents to the driver.

A further object of the present invention is the provision of an auxiliary steering arrangement which may be readily mounted or removed from the steering wheel normally found in tractors.

Still another object of the present invention resides in the provision of a driving arrangement for a tractor by means of which the operator may steer the tractor without having to mount the same.

A further object of the present invention is the provision of a steering arrangement which is so connected with the conventional steering wheel and steering column of the tractor as to be readily removable, yet which extends in such a way as to be actuatable from the side thereof by the operator without having to step within the region of the front and rear wheels of the driver.

A further object of the present invention resides in the reduction of accidents in the operation of a tractor, particularly to the operator who may have dismounted the tractor and controls the same while walking along on the side thereof.

These and other objects, features and advantages of the present invention will become more obvious from the following description when taken in connection with the accompanying drawing, which shows, for purposes of illustration only, one embodiment in accordance with present invention, and wherein:

Figure 1 is a top plan view of a tractor with the auxiliary steering mechanism in accordance with the present invention; and Figure 2 is a longitudinal cross-sectional view, on an enlarged scale, through the auxiliary steering spindle support in accordance with the present invention.

Referring now to the drawing, wherein like reference numerals are used throughout the various views to designate like parts, and more particularly to Figure 1, reference numeral 1 designates therein the tractor transmission on which is secured, in a conventional manner, a driver's seat 2. A steering wheel 3 is arranged in front of the driver's seat 2. The steering wheel 3 is arranged or mounted on steering column 4 which effects steering movements of the front wheels 6 over a suitable steering gear (not shown) and conventional steering rods or linkages 5.

A grooved pin 8 (Figure 2) is flangedly connected in any suitable manner to the hub 7 of the steering wheel 3, while a universal joint 9 of any appropriate construction is placed or mounted over the grooved pin 8. The part of the universal joint 9 which slips over the grooved pin 8 is provided with corresponding complementary grooves or spline keys so as to effect common rotation between the pin 8 and the universal joint 9. The universal joint 9 is connected with an auxiliary spindle 10 which terminates in an auxiliary steering wheel 11. The auxiliary spindle 10 extends laterally of the driver's seat 2 and projects beyond the cover or fender 12 (Figure 1) for the rear wheel. An auxiliary driver's seat 13 is secured on the wheel cover or fender 12 which may consist of tubular members suitably secured together, for example, by welding. The auxiliary spindle means 10 is supported for rotation exclusively by means of the universal joint 9 and by support means, described hereinafter, on the cover 12 near the auxiliary steering wheel 11.

A member 15 is clamped to the vertical strut 14 of the auxiliary seat 13 closest to the spindle 10 for purposes of supporting thereon the spindle 10 by means of a bolt or pin 16 of the stationary spindle hub 17. The bolt extends into the clamp 15 and is secured thereat by means of a spring clamp or snap ring 18. A locking disk 19 is operatively connected with the spindle hub 17 and cooperates with a shift lock 20. The shift lock 20 consists of a lever 21 rigidly connected with the auxiliary spindle 10 in which a retention or stopping pin 22 is supported. The retention pin 22 is provided with a transverse slot 23 which engages the locking disk 19. The lever 21 may be tightly secured due to the locking disk 19 by tightening the knurled nut 24 of the retention pin 22 whereby the locking disk 19 is forced against the lever 21 by means of the engagement thereof with the slot 23 in the retention pin 22 and to thereby lock the lever 21 with the disk 19 by frictional engagement.

*Operation*

As the tractor moves over the field at a relatively low speed for purposes of loading operations, it may be steered in the desired driving direction by means of the auxiliary steering wheel 11 in that the operator steps up to the tractor laterally from behind and operates the auxiliary steering wheel 11 in the normal manner. If the once preselected driving direction is to be maintained, then the nut 24 is manually tightened whereby the locking disk 19 is forced against the lever 21 by means of the slot in the pin 22 and thereby retains the auxiliary steering column 10 in the desired position.

If the auxiliary steering arrangement is no longer needed, then it is only necessary to release the spring clamp 18, lift the bolt 16 out of the clamping device 15 and pull the spindle 10 off the pin 8 whereupon the auxiliary steering mechanism may be readily removed.

It is understood that the present invention is not limited to the specific details shown and disclosed herein but is susceptible of many changes and modifications within the spirit and scope of the present invention. Moreover, an auxiliary steering arrangement in accordance with the present invention may also be used in conjunction with a tractor provided with a speed-control arrangement such as disclosed, for example, in the copending application Serial No. 720,715, filed March 11, 1958, entitled "Speed Control Arrangement for Tractor-Type Vehicles," and assigned to the assignee of the present application. In addition or in the alternative, the auxiliary steering arrangement of the present application may also be used in connection with a tractor having a control arrangement as disclosed in United States application Serial No. 722,873, filed March 28, 1958, entitled "Control Arrangement for Tractors," and also assigned to the assignee of the present application.

Thus, it is seen that the present invention is susceptible of many changes and modifications within the spirit and scope of the present invention and may be used in conjunction with other control arrangements, and we, therefore, intend to cover all such changes and modifications as encompassed by the appended claims.

We claim:

1. A tractor provided with rear wheel means and cover means therefor, a steering mechanism including a steering wheel arranged in front of the driver's seat and a steering column supporting said steering wheel, auxiliary steering means including auxiliary spindle means, and means including universal joint means for readily detachably connecting said spindle means with said steering wheel, said auxiliary spindle means extending rearwardly from said steering wheel to within the region of said cover means and including an auxiliary steering wheel attached to the free end thereof, said auxiliary steering wheel being disposed in such a manner so as to lie essentially within the outer contour of said tractor and to be operable laterally thereof, said steering mechanism further including support means for supporting said auxiliary spindle means on said cover means near said auxiliary steering wheel, stationary locking means attached to said support means and locking means cooperating with said stationary locking means for locking said steering mechanism in the desired driving direction, said auxiliary spindle means being supported for rotation exclusively by said support means and said universal joint means.

2. A tractor provided with rear wheel means and cover means therefor, a steering mechanism including a steering wheel arranged in front of the driver's seat and a steering column supporting said steering wheel, auxiliary steering means including auxiliary spindle means, and means including universal joint means for readily detachably connecting said auxiliary spindle means with said steering wheel, said auxiliary spindle means extending rearwardly from said steering wheel to within the region of said cover means and including an auxiliary steering wheel attached to the free end thereof, said auxiliary steering wheel being disposed in such a manner so as to lie essentially within the outer contour of said tractor and to be operable laterally thereof, said steering mechanism further including support means for supporting said auxiliary spindle means on said cover means near said auxiliary steering wheel, stationary locking disk means attached to said support means and locking means cooperating with said locking disk for locking said steering mechanism in the desired driving direction.

3. A tractor according to claim 2, wherein said locking means includes a lever means rigidly connected with said auxiliary spindle means and including locking pin means slidably arranged in said lever means and provided with transverse slot means therein, said locking disk means being in engagement with said slot means, and means for moving said pin means to thereby secure said lever means to said disk means by frictional engagement therebetween and to thereby lock said steering mechanism in the desired driving direction.

4. A tractor according to claim 2, further comprising auxiliary seat means arranged on said cover means, said support means including members of said seat means.

References Cited in the file of this patent

UNITED STATES PATENTS

| | | |
|---|---|---|
| 1,442,114 | Asper | Jan. 16, 1923 |
| 1,512,595 | Hackney | Oct. 21, 1924 |
| 1,540,472 | Heurer et al. | June 2, 1925 |
| 1,593,270 | Schaefer | July 20, 1926 |
| 1,804,333 | Gregoire | May 5, 1931 |
| 1,928,551 | Ball | Sept. 26, 1933 |
| 2,617,661 | Kucera | Nov. 11, 1952 |
| 2,669,317 | Celien | Feb. 16, 1954 |
| 2,820,644 | Smith | Jan. 21, 1958 |